US012595321B2

(12) United States Patent
Ngo et al.

(10) Patent No.: US 12,595,321 B2
(45) Date of Patent: Apr. 7, 2026

(54) CATALYST SYSTEM BASED ON A RARE-EARTH METALLOCENE AND A CO-CATALYST HAVING A PLURALITY OF CARBON-MAGNESIUM BONDS

(71) Applicants: COMPAGNIE GENERALE DES ETABLISSEMENTS MICHELIN, Clermont-Ferrand (FR); CENTRE NATIONAL DE LA RECHERCHE SCIENTIFIQUE, Paris Cedex (FR); ECOLE SUPERIEURE DE CHIMIE PHYSIQUE ELECTRONIQUE DE LYON, Villeurbanne Cedex (FR); UNIVERSITÉ CLAUDE BERNARD LYON 1, Villeurbanne Cedex (FR)

(72) Inventors: Robert Ngo, Clermont-Ferrand Cedex (FR); Nicolas Baulu, Clermont-Ferrand Cedex (FR); Christophe Boisson, Tramoyes (FR); Franck D'Agosto, Genas (FR); François Jean-Baptiste-Dit-Dominique, Clermont-Ferrand Cedex (FR); Julien Thuilliez, Clermont-Ferrand Cedex (FR)

(73) Assignees: COMPAGNIE GENERALE DES ETABLISSEMENTS MICHELIN, Clermont-Ferrand (FR); CENTRE NATIONAL DE LA RECHERCHE SCIENTIFIQUE, Paris Cedex (FR); ECOLE SUPERIEURE DE CHIMIE PHYSIQUE ELECTRONIQUE DE LYON, Villeurbanne Cedex (FR); UNIVERSITÉ CLAUDE BERNARD LYON 1, Villeurbanne Cedex (FR)

( * ) Notice: Subject to any disclaimer, the term of this patent is extended or adjusted under 35 U.S.C. 154(b) by 504 days.

(21) Appl. No.: 18/038,505

(22) PCT Filed: Nov. 19, 2021

(86) PCT No.: PCT/FR2021/052044

§ 371 (c)(1),
(2) Date: May 24, 2023

(87) PCT Pub. No.: WO2022/112691

PCT Pub. Date: Jun. 2, 2022

(65) Prior Publication Data

US 2024/0117080 A1 Apr. 11, 2024

(30) Foreign Application Priority Data

Nov. 24, 2020 (FR) ....................................... 2012078

(51) Int. Cl.
*C08F 10/02* (2006.01)

(52) U.S. Cl.
CPC .................................. *C08F 10/02* (2013.01)

(58) Field of Classification Search
CPC ........ C08F 210/02; C08F 4/50; C08F 236/06; C08F 4/545; C08F 4/52; C08F 2/001; C08F 2500/34
USPC ........................................ 502/177, 150, 152
See application file for complete search history.

(56) References Cited

U.S. PATENT DOCUMENTS

2013/0211010 A1* 8/2013 Horikawa ................. B60C 1/00 525/232
2023/0406966 A1* 12/2023 Baulu ................... C08F 210/02
2024/0026058 A1* 1/2024 Ngo ...................... C08F 210/02

FOREIGN PATENT DOCUMENTS

| | | | |
|---|---|---|---|
| EP | 1092731 | A1 | 4/2001 |
| WO | 2004035639 | A1 | 4/2004 |
| WO | 2007054223 | A2 | 5/2007 |
| WO | 2007054224 | A2 | 5/2007 |
| WO | 2013135314 | A1 | 9/2013 |
| WO | 2016092237 | A1 | 6/2016 |
| WO | 2017093654 | A1 | 6/2017 |
| WO | 2018020122 | A1 | 2/2018 |
| WO | 2018224776 | A1 | 12/2018 |

OTHER PUBLICATIONS

4. N. Baulu , M.-N. Poradowski , L. Verrieux , J. Thuilliez , F. Jean-Baptiste-dit-Dominique , L. Perrin , F. D'Agosto and C. Boisson , Polym. Chem., 2022, 13 , 1970-1977 (Year: 2022).*
Jerry March, "Advanced Organic Chemistry," 4th Edition, 1992, pp. 622-623.
Gary S. Silverman, Philip E. Rakita, "Handbook of Grignard Reagents," 1996, pp. 502-503.
International Search Report (ISR) for International Application No. PCT/FR2021/052044 mailed Mar. 11, 2022, 6 pages.
Wehmschulte Rudolf et al., "Synthesis and Characterization of an Unsolvated Dimeric Diarylmagnesium Compound and Its Magnesium Iodide Byproducts," Inorganic Chemistry, vol. 40, No. 23, Oct. 12, 2002, pp. 6004-6008.

(Continued)

*Primary Examiner* — Mark S Kaucher
(74) *Attorney, Agent, or Firm* — Dickinson Wright PLLC

(57) ABSTRACT

A catalytic system based on at least one rare-earth metallocene and an organomagnesium reagent as co-catalyst of formula $R^B$—(Mg—$R^A$)$_m$—Mg—$R^B$ is provided. According to the formula, $R^B$ comprises a benzene nucleus substituted with the magnesium atom. One of the carbon atoms of the benzene nucleus ortho to the magnesium is substituted with a methyl, an ethyl or an isopropyl or forms a ring with the carbon atom which is its closest neighbour and which is meta to the magnesium. The other carbon atom of the benzene nucleus ortho to the magnesium is substituted with a methyl, an ethyl or an isopropyl. $R^A$ is a divalent aliphatic hydrocarbon-based chain, optionally interrupted with one or more oxygen or sulfur atoms or with one or more arylene groups. The m is a number greater than or equal to 1, preferably 1. The catalytic system allows the synthesis of dienic and/or ethylenic telechelic polymers.

20 Claims, No Drawings

(56) References Cited

OTHER PUBLICATIONS

Shiono Takeshi et al., "Synthesis and Application of Terminally Magnesium Bromide-Functionalized Isotactic Poly (Propene)," NL, vol. 89, Mar. 10, 1994, pp. 119-128.

* cited by examiner

CATALYST SYSTEM BASED ON A RARE-EARTH METALLOCENE AND A CO-CATALYST HAVING A PLURALITY OF CARBON-MAGNESIUM BONDS

This U.S. patent application is a national phase entry of international patent application no. PCT/FR2021/052044, filed Nov. 19, 2021, which claims priority to French patent application no. FR2012078, filed Nov. 24, 2020, the entire contents of which are incorporated herein by reference in their entirety.

BACKGROUND

1. Technical Field

The field of the present invention is that of catalytic systems that may be used in the preparation of telechelic polyolefins.

2. Related Art

The synthesis of polyolefins by polymerization of an olefin in the presence of a catalytic system comprising a rare-earth metallocene and a co-catalyst is well known. The co-catalyst is used to activate the metallocene for polymerization. The co-catalyst may be an organolithium, organomagnesium or organoaluminium reagent, for instance as described in patent applications EP 1 092 731, WO 2004/035639, WO 2007/054224 and WO 2018/224776. When the co-catalyst is an organomagnesium reagent, it is typically an organomagnesium chloride or an organomagnesium reagent in which the magnesium atom is bonded to two aliphatic groups, such as dibutylmagnesium, butylethylmagnesium and butyloctylmagnesium.

It is also known that the synthesis of functional polyolefins from these catalytic systems requires a functionalization step. This functionalization step is subsequent to the polymerization reaction and is performed by adding a modifying agent, generally at the end of the polymerization. This first method allows the functionalization of only one chain end of the polymer. An alternative to this first method was to propose the use of functional transfer agents instead of co-catalysts. These functional transfer agents described in patent applications WO 2016/092237 and WO 2013/135314 are, for example, organomagnesium reagents bearing an amine, ether or vinyl function. This alternative indeed makes it possible to omit the additional functionalization step after the polymerization reaction to form functional polymers. However, this alternative leads, like the first method, to the functionalization of only one chain end of the polymer, unless an additional functionalization step is performed at the end of the polymerization. There is therefore concern to find a solution that allows the preparation of polyolefins that are functionalized at both chain ends in a process that is efficient and simpler.

SUMMARY

The Applicants have discovered a catalytic system that allows the preparation of telechelic polymers via an efficient and simple process. The catalytic system has the particular feature of comprising a rare-earth metallocene and a particular organomagnesium co-catalyst which contains two magnesium atoms each bonded to a separate carbon atom and constituting a separate specifically substituted benzene nucleus.

Thus, a first subject of the invention is a catalytic system based at least:

on a metallocene of formula (Ia) or (Ib), on an organomagnesium reagent as co-catalyst, $$\{P(Cp^1)(Cp^2)Y\} \quad \text{(Ia)}$$

$$Cp^3Cp^4Y \quad \text{(Ib)}$$

Y denoting a group including a rare-earth metal atom, $Cp^1$, $Cp^2$, $Cp^3$ and $Cp^4$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the organomagnesium reagent being a compound of formula (II)

$$R^B\text{—}(Mg\text{—}R^A)_m\text{—}Mg\text{—}R^B \quad \text{(II)}$$

$R^B$ being different from $R^A$, $R^B$ comprising a benzene nucleus substituted with the magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being a divalent aliphatic hydrocarbon-based chain, interrupted or not with one or more oxygen or sulfur atoms or with one or more arylene groups, m being a number greater than or equal to 1 and preferably equal to 1.

A second subject of the invention is a process for preparing a first telechelic polymer, which comprises a step of polymerization of a monomer M in the presence of a catalytic system in accordance with the invention, the monomer M being chosen from the group of monomers consisting of 1,3-dienes, ethylene, α-monoolefins and mixtures thereof. The first telechelic polymer has the particular feature of bearing at each of its ends a terminal group having a reactive carbon-magnesium bond.

A third subject of the invention is a process for preparing a second telechelic polymer, which comprises a step of polymerization of a monomer M in the presence of a catalytic system in accordance with the invention, this polymerization step being followed by a step of functionalization with a modifying agent, the monomer M being chosen from the group of monomers consisting of 1,3-dienes, ethylene, α-monoolefins and mixtures thereof. The second telechelic polymer has the particular feature of bearing a functional group at each of its ends.

The invention also relates to a telechelic polymer of formula $R^B$—Mg-poly-$R^A$-poly-Mg—$R^B$, $R^A$ and $R^B$ being defined as previously, the term "poly" in the formula denoting a polymer chain of a 1,3-diene, ethylene, an α-monoolefin or mixtures thereof. The telechelic polymer in accordance with the invention may be obtained via a process in accordance with the invention, which is the second subject of the invention.

The invention also relates to a process for preparing a polymer, which comprises a step of polymerization of a monomer M in the presence of a catalytic system in accordance with the invention and a termination reaction with a protic compound, the monomer M being chosen from the group of monomers consisting of 1,3-dienes, ethylene, α-monoolefins and mixtures thereof.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b).

Unless otherwise indicated, the contents of the units resulting from the insertion of a monomer into a polymer are expressed as a molar percentage relative to the total monomer units that constitute the polymer.

The compounds mentioned in the description may be of fossil origin or may be biobased. In the latter case, they may be partially or totally derived from biomass or may be obtained from renewable starting materials derived from biomass. Similarly, the compounds mentioned may also be derived from the recycling of already-used materials, i.e. they may be partly or totally derived from a recycling process, or obtained from raw materials which are themselves derived from a recycling process.

The term "based on" used to define the constituents of the catalytic system means the mixture of these constituents, or the product of the reaction of a portion or all of these constituents with each other.

In the present patent application, the term "metallocene" means an organometallic complex, the metal of which, in the case in point the rare-earth metal atom, is bonded to two groups $Cp^3$ and $Cp^4$ or to a ligand molecule consisting of two groups $Cp^1$ and $Cp^2$ connected together by a bridge P. These groups $Cp^1$, $Cp^2$, $Cp^3$ and $Cp^4$, which are identical or different, are chosen from the group consisting of fluorenyl groups, cyclopentadienyl groups and indenyl groups, these groups possibly being substituted or unsubstituted. It is recalled that rare-earth elements are metals and denote the elements scandium, yttrium and the lanthanides, the atomic number of which ranges from 57 to 71.

According to a first variant of the invention, the metallocene used as base constituent in the catalytic system in accordance with the invention corresponds to formula (Ia)

$$\{P(Cp^1)(Cp^2)Y\} \quad \text{(Ia)}$$

in which

Y denotes a group including a rare-earth metal atom, $Cp^1$ and $Cp^2$, which are identical or different, are chosen from the group consisting of fluorenyl groups, cyclopentadienyl groups and indenyl groups, the groups being substituted or unsubstituted, P is a group bridging the two groups $Cp^1$ and $Cp^2$ and comprising a silicon or carbon atom.

According to a second variant of the invention, the metallocene used as base constituent in the catalytic system in accordance with the invention corresponds to formula (Ib)

$$Cp^3Cp^4Y \quad \text{(Ib)}$$

in which

Y denotes a group including a rare-earth metal atom, $Cp^3$ and $Cp^4$, which are identical or different, are chosen from the group consisting of fluorenyl groups, cyclopentadienyl groups and indenyl groups, the groups being substituted or unsubstituted.

As substituted cyclopentadienyl, fluorenyl and indenyl groups, mention may be made of those substituted with alkyl radicals containing from 1 to 6 carbon atoms or with aryl radicals containing from 6 to 12 carbon atoms or else with trialkylsilyl radicals, such as $SiMe_3$. The choice of the radicals is also guided by the accessibility to the corresponding molecules, which are the substituted cyclopentadienes, fluorenes and indenes, since said molecules are commercially available or can be readily synthesized.

As substituted fluorenyl groups, mention may be made of those substituted in position 2, 7, 3 or 6, particularly 2,7-di(tert-butyl)fluorenyl and 3,6-di(tert-butyl)fluorenyl. The 2, 3, 6 and 7 positions respectively denote the position of the carbon atoms of the rings as represented in the diagram below, the 9 position corresponding to the carbon atom to which the bridge P is attached.

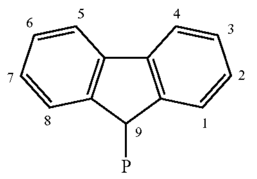

As substituted cyclopentadienyl groups, mention may be made of those substituted in the 2 (or 5) position and also in the 3 (or 4) position, particularly those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

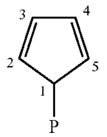

As substituted indenyl groups, mention may be made particularly of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

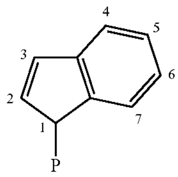

Preferably, the metallocene is of formula (Ia).

According to a preferential embodiment of the invention, $Cp^1$ and $Cp^2$ are identical and are chosen from the group consisting of substituted fluorenyl groups and the unsubstituted fluorenyl group of formula $C_{13}H8$. The catalytic system according to this preferential embodiment has the distinguishing feature of resulting in copolymers of butadiene and ethylene which comprise, in addition to the ethylene monomer units and the butadiene units of the cyclic units, 1,2-cyclohexane units having the following formula:

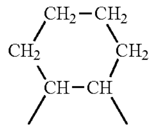

The cyclic units result from a particular insertion of ethylene and 1,3-butadiene monomers into the polymer chain, in addition to the conventional ethylene and 1,3-butadiene units, respectively —$(CH_2—CH_2)$—, —$(CH_2—CH{=}CH—CH_2)$— and —$(CH_2—CH(C{=}CH_2))$—. The mechanism for obtaining such a microstructure is described, for example, in Macromolecules 2009, 42, 3774-3779.

Advantageously, $Cp^1$ and $Cp^2$ are identical and each represent an unsubstituted fluorenyl group of formula $C_{13}H8$, represented by the symbol Flu.

According to a preferential embodiment of the invention, the symbol Y represents the group Met-G, with Met denoting the rare-earth metal and G denoting a group comprising the borohydride $BH_4$ unit or denoting a halogen atom chosen from the group consisting of chlorine, fluorine, bromine and iodine. Advantageously, G denotes a chlorine atom or the group of formula (III):

$$(BH_4)_{(1+y)}\text{-}L_y\text{-}N_x \qquad \text{(III)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

Very advantageously, G denotes the group of formula (III).

Any ether which has the ability to complex the alkali metal, notably diethyl ether and tetrahydrofuran, is suitable as ether.

According to any one of the embodiments of the invention, the metal of the metallocene that is useful for the purposes of invention, in the case in point the rare-earth metal, is preferably a lanthanide, the atomic number of which ranges from 57 to 71, more preferentially neodymium, Nd.

The bridge P connecting the groups $Cp^1$ and $Cp^2$ preferably corresponds to the formula $ZR^1R^2$, in which Z represents a silicon or carbon atom and $R^1$ and $R^2$, which are identical or different, each represent an alkyl group comprising from 1 to 20 carbon atoms, preferably a methyl. In the formula $ZR^1R^2$, Z advantageously represents a silicon atom, Si.

The metallocene that is useful for the synthesis of the catalytic system may be in the form of a crystalline or non-crystalline powder, or else in the form of single crystals. The metallocene may be in a monomer or dimer form, these forms depending on the method of preparation of the metallocene, as is described, for example, in patent application WO 2007/054224 or WO 2007/054223. The metallocene may be prepared conventionally by a process analogous to that described in patent application WO 2007/054224 or WO 2007/054223, notably by reaction, under inert and anhydrous conditions, of the salt of an alkali metal of the ligand with a rare-earth metal borohydride in a suitable solvent, such as an ether, for instance diethyl ether or tetrahydrofuran, or any other solvent known to those skilled in the art. After reaction, the metallocene is separated from the reaction by-products via techniques known to those skilled in the art, such as filtration or precipitation from a second solvent. The metallocene is finally dried and isolated in solid form.

According to a particularly preferential embodiment, the metallocene is of formula (III-1), (III-2), (III-3), (III-4) or (III-5):

$$[Me_2Si(Flu)_2Nd(\mu\text{-}BH_4)_2Li(THF)] \qquad \text{(III-1)}$$

$$[\{Me_2SiFlu_2Nd(\mu\text{-}BH_4)_2Li(THF)\}_2] \qquad \text{(III-2)}$$

$$[Me_2SiFlu_2Nd(\mu\text{-}BH_4)(THF)] \qquad \text{(III-3)}$$

$$[\{Me_2SiFlu_2Nd(\mu\text{-}BH_4)(THF)\}_2] \qquad \text{(III-4)}$$

$$[Me_2SiFlu_2Nd(\mu\text{-}BH_4)] \qquad \text{(III-5)}$$

in which Flu represents the $C_{13}H_8$ group.

Another basic component of the catalytic system in accordance with the invention is the co-catalyst, an organomagnesium reagent of formula (II) in which $R^B$ is different from $R^A$, $R^B$ comprises a benzene nucleus substituted with the magnesium atom, one of the carbon atoms of the benzene nucleus ortho to the magnesium being substituted with a methyl, an ethyl or an isopropyl or forming a ring with the carbon atom which is its closest neighbour and which is in the meta position relative to the magnesium, the other carbon atom of the benzene nucleus in the ortho position relative to the magnesium being substituted with a methyl, an ethyl or an isopropyl, $R^A$ is a divalent aliphatic hydrocarbon-based chain, interrupted or not with one or more oxygen or sulfur atoms or with one or more arylene groups, m is a number greater than or equal to 1, preferably equal to 1.

$$R^B—(Mg—R^A)_m—Mg—R^B \qquad \text{(II)}$$

The organomagnesium reagent of formula (II) is thus characterized in that it comprises two magnesium atoms, each magnesium atom being bonded to two carbon atoms. In the organomagnesium reagent of formula (II), two magnesium atoms each share a first bond with a first carbon atom belonging to $R^B$ and a second bond with a second carbon atom belonging to $R^A$. The first carbon atom is a constituent of the benzene nucleus of $R^B$. The second carbon atom is a constituent of the aliphatic hydrocarbon-based chain $R^A$ which may contain within its chain one or more heteroatoms chosen from oxygen and sulfur or one or more arylene groups. In the preferential case where m is equal to 1, each magnesium atom thus shares a first bond with a first carbon atom of $R^B$ and a second bond with a second carbon atom of $R^A$.

$R^B$ has the essential feature of comprising a benzene nucleus substituted with the magnesium atom. The two carbon atoms of the benzene nucleus of $R^B$ ortho to the magnesium bear an identical or different substituent. Alternatively, one of the two carbon atoms of the benzene nucleus of $R^B$ ortho to the magnesium may bear a substituent, and the other carbon atom of the benzene nucleus of $R^B$ ortho to the magnesium may form a ring. The substituent is a methyl, an ethyl or an isopropyl. In the case where one of the two carbon atoms of the benzene nucleus of $R^B$ ortho to the magnesium is substituted with an isopropyl, the second carbon atom of the benzene nucleus of $R^B$ ortho to the magnesium is preferably not substituted with an isopropyl. Preferably, the carbon atoms of the benzene nucleus of $R^B$ ortho to the magnesium are substituted with a methyl or an ethyl. More preferentially, the carbon atoms of the benzene nucleus of $R^B$ ortho to the magnesium are substituted with a methyl.

According to a preferential embodiment of the invention, the organomagnesium reagent corresponds to formula (IV-m) in which m is greater than or equal to 1, $R_1$ and $R_5$, which are identical or different, represent a methyl or an ethyl, preferably a methyl, $R_2$, $R_3$ and $R_4$, which are identical or different, represent a hydrogen atom or an alkyl and $R^A$ is a divalent aliphatic hydrocarbon-based chain, interrupted or not with one or more oxygen or sulfur atoms or with one or more arylene groups. Preferably, $R_1$ and $R_5$ represent a methyl. Preferably, $R_2$ and $R_4$ represent a hydrogen atom.

(IV-m)

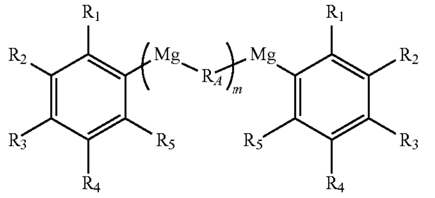

The organomagnesium reagent of formula (IV-m) is of formula (IV-1) in the case where m is equal to 1.

(IV-1)

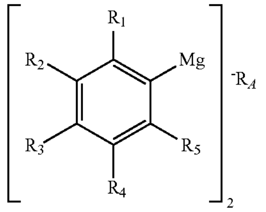

According to a preferential variant, $R_1$, $R_3$ and $R_5$ are identical in formula (IV-m), notably in formula (IV-1). According to a more preferential variant, $R_2$ and $R_4$ represent a hydrogen and $R_1$, $R_3$ and $R_5$ are identical. In a more preferential variant, $R_2$ and $R_4$ represent a hydrogen and $R_1$, $R_3$ and $R_5$ represent a methyl.

In formulae (II) and (IV-m), in particular in formula (IV-1), $R^A$ is a divalent aliphatic hydrocarbon-based chain which may contain within its chain one or more heteroatoms chosen from oxygen and sulfur or one or more arylene groups. Preferably, $R^A$ is a branched or linear alkanediyl, cycloalkanediyl or xylenediyl radical. More preferentially, $R^A$ is an alkanediyl. Preferably, $R^A$ contains 3 to 10 carbon atoms, in particular 3 to 8 carbon atoms. Even more preferentially, $R^A$ is an alkanediyl containing 3 to 10 carbon atoms. Advantageously, $R^A$ is an alkanediyl containing 3 to 8 carbon atoms. Very advantageously, $R^A$ is a linear alkanediyl. 1,3-propanediyl, 1,4-butanediyl, 1,5-pentanediyl, 1,6-hexanediyl, 1,7-heptanediyl and 1,8-octanediyl are most particularly suitable as group $R^A$.

According to any one of the embodiments of the invention, m is preferentially equal to 1 in formula (II), in particular in formula (IV-m).

The organomagnesium compound that is useful for the purposes of the invention as co-catalyst may be prepared via a process which comprises the reaction of a first organomagnesium reagent of formula XMg—$R^A$—MgX with a second organomagnesium reagent of formula $R^B$—Mg—X, in which X represents a halogen atom, preferentially bromine or chlorine, $R^B$ and $R^A$ being as defined previously. X is more preferentially a bromine atom. The stoichiometry used in the reaction determines the value of m in formula (II) and in formula (IV-m). For example, a mole ratio of 0.5 between the amount of the first organomagnesium reagent and the amount of the second organomagnesium reagent is favourable to the formation of an organomagnesium compound of formula (II) in which m is equal to 1, whereas a mole ratio of greater than 0.5 will be more favourable to the formation of an organomagnesium compound of formula (II) in which m is greater than 1.

To perform the reaction of the first organomagnesium reagent with the second organomagnesium reagent, a solution of the second organomagnesium reagent is typically added to a solution of the first organomagnesium reagent. The solutions of the first organomagnesium reagent and the second organomagnesium reagent are generally solutions in an ether, such as diethyl ether, dibutyl ether, tetrahydrofuran, methyltetrahydrofuran, or a mixture of two or more of these ethers. Preferably, the respective concentrations of the solutions of the first organomagnesium reagent and the second organomagnesium reagent are from 0.01 to 3 mol/L and from 0.02 to 5 mol/L, respectively. More preferentially, the respective concentrations of the first organomagnesium reagent and the second organomagnesium reagent are from 0.1 to 2 mol/L and from 0.2 to 4 mol/L, respectively.

The first organomagnesium reagent and the second organomagnesium reagent may be prepared beforehand by a Grignard reaction from magnesium metal and a suitable precursor. For the first organomagnesium reagent and the second organomagnesium reagent, the respective precursors are of formula X—$R^A$—X et $R^B$—X, $R^A$, $R^B$ and X being as defined previously. The Grignard reaction is typically performed by adding the precursor to magnesium metal which is generally in the form of chips. Preferably, iodine (I2) typically in the form of beads is introduced into the reactor prior to the addition of the precursor to activate the Grignard reaction in a known manner.

Alternatively, the organomagnesium compound that is useful for the purposes of the invention as co-catalyst may be prepared by reacting an organometallic compound of formula M-$R^A$-M and the organomagnesium reagent of formula $R^B$—Mg—X, where M represents a lithium, sodium or potassium atom, X, $R^B$ and $R^A$ being as defined previously. Preferably, M represents a lithium atom, in which case the organometallic compound of formula M-$R^A$-M is an organolithium reagent. The reaction of the organolithium reagent and of the organomagnesium reagent is typically performed in an ether such as diethyl ether, dibutyl ether, tetrahydrofuran or methyltetrahydrofuran. The reaction is also typically performed at a temperature ranging from 0° C. to 60° C. The placing in contact is preferably performed at a temperature of between 0° C. and 23° C. The placing in contact of the organometallic compound of formula M-$R^A$-M with the organomagnesium reagent of formula $R^B$—Mg—X is preferentially performed by adding a solution of the organometallic compound M-$R^A$-M to a solution of the organomagnesium reagent $R^B$—Mg—X. The solution of the organometallic compound M-$R^A$-M is generally a solution in a hydrocarbon-based solvent, preferably n-hexane, cyclohexane or methylcyclohexane, and the solution of the organomagnesium reagent $R^B$—Mg—X is generally a solution in an ether, preferably diethyl ether or dibutyl ether. Preferably, the respective concentrations of the solutions of the organometallic compound and of the organomagnesium reagent M-$R^A$-M and $R^B$—Mg—X are from 0.01 to 1 mol/L and from 0.02 to 5 mol/L, respectively. More preferentially, the respective concentrations of the solutions of the organometallic compound and of the organomagnesium reagent M-$R^A$-M and $R^B$—Mg—X are from 0.05 to 0.5 mol/L and from 0.2 to 3 mol/L, respectively.

As with any synthesis performed in the presence of organometallic compounds, the syntheses described for the synthesis of the organomagnesium reagents that are useful for the purposes of the invention and for the synthesis of the organomagnesium reagent in accordance with the invention, take place under anhydrous conditions under an inert atmosphere, in stirred reactors. Typically, the solvents and the solutions are used under anhydrous nitrogen or argon.

Once the organomagnesium reagent that is useful for the purposes of the invention has been formed, it is generally recovered in solution after filtration performed under an inert anhydrous atmosphere. It may be stored prior to use in its solution in sealed containers, for example capped bottles, at a temperature of between −25° C. and 23° C.

Like any organomagnesium compound, the organomagnesium compound $R^B$—(Mg—$R^A$)$_m$—Mg—$R^B$ that is useful for the purposes of the invention may be in the form of a monomeric species ($R^B$—(Mg—$R^A$)$_m$—Mg—$R^B$)$_1$ or in the form of a polymeric species ($R^B$—(Mg—$R^A$)$_m$—Mg—$R^B$)$_p$, where p is an integer greater than 1, notably dimer ($R^B$—(Mg—$R^A$)$_m$—Mg—$R^B$)$_2$, where m is as defined previously. Moreover, whether it is in the form of a monomer or polymer species, it may also be in the form of a species coordinated to one or more molecules of a solvent, preferably of an ether such as diethyl ether, tetrahydrofuran or methyltetrahydrofuran.

The catalytic system in accordance with the invention may be prepared conventionally via a process analogous to that described in patent application WO 2007/054224 or WO 2007/054223. For example, the organomagnesium reagent $R^B$—Mg—$R^A$—Mg—$R^B$ that is useful for the purposes of the invention and the metallocene are reacted in a hydrocarbon-based solvent typically at a temperature ranging from 20 to 80° C. for a period of between 5 and 60 minutes. The amounts of co-catalyst and of metallocene reacted are such that the ratio between the number of moles of Mg of the co-catalyst and the number of moles of rare-earth metal of the metallocene is preferably from 1 to 200 and more preferentially from 1 to less than 20. The range of values extending from 1 to less than 20 is notably more favourable for obtaining polymers of high molar masses. The catalytic system is generally prepared in an aliphatic hydrocarbon-based solvent such as methylcyclohexane, or an aromatic hydrocarbon-based solvent such as toluene. Generally, after its synthesis, the catalytic system is used as is in the process for the synthesis of the polymer in accordance with the invention.

Alternatively, the catalytic system in accordance with the invention may be prepared via a process analogous to that described in patent application WO 2017/093654 A1 or in patent application WO 2018/020122 A1. According to this alternative, the catalytic system also contains a preformation monomer chosen from a conjugated diene, ethylene or a mixture of ethylene and a conjugated diene, in which case the catalytic system is based at least on the metallocene, the organomagnesium reagent $R^B$—Mg—$R^A$—Mg—$R^B$ that is useful for the purposes of the invention and the preformation monomer. For example, the organomagnesium reagent and the metallocene are reacted in a hydrocarbon-based solvent typically at a temperature of from 20° C. to 80° C. for 10 to 20 minutes to obtain a first reaction product, and the preformation monomer, chosen from a conjugated diene, ethylene or a mixture of ethylene and a conjugated diene, is then reacted with this first reaction product at a temperature ranging from 40° C. to 90° C. for 1 hour to 12 hours. The conjugated diene, as preformation monomer, is preferably a 1,3-diene such as 1,3-butadiene, isoprene or a 1,3-diene of formula $CH_2$═CR—CH═$CH_2$, the symbol R representing a hydrocarbon chain containing 3 to 20 carbon atoms, in particular myrcene or β-farnesene. The catalytic system thus obtained may be used directly in the process in accordance with the invention or may be stored under an inert atmosphere, notably at a temperature ranging from −20° C. to room temperature (23° C.), before being used in the synthesis of polymers.

Like any synthesis performed in the presence of an organometallic compound, the synthesis of the metallocene, the synthesis of the organomagnesium reagent and the synthesis of the catalytic system take place under anhydrous conditions under an inert atmosphere. Typically, the reactions are performed starting with anhydrous solvents and compounds under anhydrous nitrogen or argon.

The catalytic system may be in the form of a solution when it is in the presence of a hydrocarbon-based solvent. The hydrocarbon-based solvent may be aliphatic, such as methylcyclohexane, or aromatic, such as toluene. The hydrocarbon-based solvent is preferably aliphatic, more preferentially methylcyclohexane. Generally, the catalytic system is stored in the form of a solution in the hydrocarbon-based solvent before being used in polymerization. This may then be referred to as a catalytic solution which comprises the catalytic system and the hydrocarbon-based solvent. According to any of the embodiments of the invention, the catalytic system preferably comprises a hydrocarbon-based solvent. When the catalytic system is in solution, its concentration is defined by the content of metallocene metal in the solution. The concentration of metallocene metal has a value preferentially ranging from 0.0001 to 0.2 mol/L, more preferentially from 0.001 to 0.03 mol/L.

The catalytic system according to the invention is intended to be used in processes for the synthesis of polymers, notably elastomers, which may be used in rubber compositions, for example for tyres.

A first process allows the preparation of telechelic polymers which have the particular feature of having a carbon-magnesium bond at each of their ends. The first process comprises a polymerization step in the presence of a catalytic system in accordance with the invention.

A second process allows the preparation of telechelic polymers which have the particular feature of having a functional group at each of their ends. It comprises a polymerization step followed by a step of functionalization with a modifying agent. The polymerization step is identical to that of the first process. The modifying agent is typically a compound known to react with a compound containing a carbon-magnesium bond. Particularly suitable modifying agents are dihalogens and ketones. The functional groups at the ends of the polymer are advantageously identical. The modifying agent is typically added to the polymerization medium. The functionalized polymer can be recovered according to conventional techniques known to those skilled in the art, for instance by precipitation, by evaporation of the solvent under reduced pressure or by steam stripping.

A third process comprises a polymerization step and a termination reaction with a protic compound. The polymerization step is identical to that of the first process and the second process. The protic compound allows the polymerization to be stopped by a termination reaction without adding functions to the polymer ends. The protic compound is, for example, an alcohol such as methanol, ethanol, isopropanol or water. It may be added to the polymerization medium. Alternatively, the polymerization medium may be poured into the protic compound such as methanol or into a solution containing the protic compound, for example a toluene solution containing methanol.

According to a particular embodiment of the third process, the protic compound is a compound which allows the labelling of the polymer ends with an isotope of the hydrogen atom such as deuterium. Suitable labelled protic compounds are deuterated water and alcohols with a hydroxyl group OD. The polymer formed can be recovered according to conventional techniques known to those skilled in the art, for instance by precipitation, by evaporation of the solvent under reduced pressure or by steam stripping.

The polymerization reaction common to the three processes in accordance with the invention is a polymerization reaction of a monomer M chosen from the group of monomers consisting of 1,3-dienes, ethylene, α-monoolefins and mixtures thereof. The term "α-monoolefin" means an α-olefin which contains a single carbon-carbon double bond, the double bonds in aromatic compounds not being taken into account. For example, styrene is considered an α-monoolefin. Preferably, the monomer M is ethylene or a mixture of a 1,3-diene and ethylene or a mixture of a 1,3-diene, ethylene and an α-monoolefin such as styrene, the 1,3-diene advantageously being 1,3-butadiene, isoprene or mixtures thereof.

The polymerization is preferably performed in solution, continuously or batchwise. The polymerization solvent may be an aromatic or aliphatic hydrocarbon-based solvent. Examples of polymerization solvents that may be mentioned include toluene and methylcyclohexane. The monomer M may be introduced into the reactor containing the polymerization solvent and the catalytic system or, conversely, the catalytic system may be introduced into the reactor containing the polymerization solvent and the monomer M. The monomer M and the catalytic system may be introduced simultaneously into the reactor containing the polymerization solvent, notably in the case of a continuous polymerization. The polymerization is typically performed under anhydrous conditions and in the absence of oxygen, in the optional presence of an inert gas. The polymerization temperature generally varies within a range extending from 25 to 120° C., preferentially from 30 to 100° C. It is adjusted according to the monomer to be polymerized. Preferably, the copolymerization is performed at a constant pressure of ethylene.

During the polymerization of ethylene and of 1,3-dienes in a polymerization reactor, ethylene and 1,3-dienes may be added continuously to the polymerization reactor, in which case the polymerization reactor is a fed reactor. This embodiment is most particularly suitable for the synthesis of a statistical copolymer.

Thus, via simple processes comprising a polymerization reaction and a reaction with a modifying agent or a labelled protic compound, polymers whose two ends bear identical functional groups or which are labelled with an isotope may be synthesized.

End-labelled polymers and end-functional polymers are obtained from telechelic polymers which contain a carbon-magnesium bond at the ends and which may be obtained via the first process. Telechelic polymers with a carbon-magnesium bond at the ends are therefore capable of giving rise, on the one hand, to the formation of polymers whose two ends are marked with an isotope of the hydrogen atom and, on the other hand, to the formation of polymers whose two ends bear identical functional groups.

Telechelic polymers containing a carbon-magnesium bond at the ends may be represented by formula (V) in which $R^A$ and $R^B$ are defined as previously, including according to the preferential embodiments described, the term "poly" denotes a polymer chain of a 1,3-diene, ethylene, an α-monoolefin or mixtures thereof.

$$R^B\text{—Mg-poly-}R^A\text{-poly-Mg—}R^B \quad (V)$$

Preferably, the polymer chain denoted by the term "poly" is a polymer chain of ethylene or a polymer chain of a 1,3-diene and ethylene or a polymer chain of a 1,3-diene, ethylene and an α-monoolefin such as styrene. The 1,3-diene is a 1,3-diene or a mixture of 1,3-dienes. 1,3-dienes that are most particularly suitable for use are 1,3-dienes containing 4 to 24 carbon atoms, such as 1,3-butadiene, isoprene and mixtures thereof. According to a particular embodiment, the polymer chain denoted by the name "poly" contains ethylene units, 1,3-butadiene units and cyclic units, 1,2-cyclohexane units. According to the particular embodiment in which the polymer chain denoted by the name "poly" contains 1,2-cyclohexane units, it preferentially contains not more than 15 mol % thereof.

According to any one of the embodiments of the invention, the polymer chain denoted by the name "poly" preferentially contains more than 50 mol % ethylene units.

According to a particularly preferential embodiment of the invention, the polymer chain denoted by the name "poly" is a statistical polymer chain of a 1,3-diene and ethylene or a statistical polymer chain of a 1,3-diene, ethylene and an α-monoolefin such as styrene.

In summary, the invention is advantageously performed according to any one of the following embodiments 1 to 42:

Embodiment 1: Catalytic system based at least:

on a metallocene of formula (Ia) or (Ib), preferably (Ia), on an organomagnesium reagent as co-catalyst, $$\{P(Cp^1)(Cp^2)Y\} \quad (Ia)$$

$$Cp^3Cp^4Y \quad (Ib)$$

Y denoting a group including a rare-earth metal atom, $Cp^1$, $Cp^2$, $Cp^3$ and $Cp^4$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the organomagnesium reagent being a compound of formula (II)

$$R^B\text{—}(Mg\text{—}R^A)_m\text{—}Mg\text{—}R^B \quad (II)$$

$R^B$ being different from $R^A$, $R^B$ comprising a benzene nucleus substituted with the magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being a divalent aliphatic hydrocarbon-based chain, interrupted or not with one or more oxygen or sulfur atoms or with one or more arylene groups, m being a number greater than or equal to 1 and preferably equal to 1.

Embodiment 2: Catalytic system according to embodiment 1, in which the metallocene is of formula (Ia).

Embodiment 3: Catalytic system according to either of embodiments 1 and 2, in which $Cp^1$ and $Cp^2$ are identical and are chosen from the group consisting of substituted fluorenyl groups and the unsubstituted fluorenyl group of formula $C_{13}H_8$.

Embodiment 4: Catalytic system according to any one of embodiments 1 to 3, in which $Cp^1$ and $Cp^2$ each represent an unsubstituted fluorenyl group of formula $C_{13}H_8$.

Embodiment 5: Catalytic system according to any one of embodiments 1 to 4, in which the symbol Y represents the group Met-G, with Met denoting the rare-earth metal atom and G denoting a group comprising the borohydride $BH_4$ unit or denoting a halogen atom chosen from the group consisting of chlorine, fluorine, bromine and iodine.

Embodiment 6: Catalytic system according to embodiment 5, in which G denotes a chlorine atom or the group of formula (III)

$$(BH_4)_{(1+y)}\text{-}L_y\text{-}N_x \quad \text{(III)}$$

in which

L represents an alkali metal chosen from the group consisting of lithium, sodium and potassium, N represents a molecule of an ether, preferably diethyl ether or tetrahydrofuran, x, which may or may not be an integer, is greater than or equal to 0, y, which is an integer, is greater than or equal to 0.

Embodiment 7: Catalytic system according to embodiment 6, in which G denotes the group of formula (III).

Embodiment 8: Catalytic system according to any one of embodiments 1 to 7, in which the rare-earth metal is a lanthanide, the atomic number of which ranges from 57 to 71.

Embodiment 9: Catalytic system according to any one of embodiments 1 to 8, in which the rare-earth metal is neodymium.

Embodiment 10: Catalytic system according to any one of embodiments 1 to 9, in which the bridge P corresponds to the formula $ZR^1R^2$, Z representing a silicon or carbon atom, $R^1$ and $R^2$, which are identical or different, each representing an alkyl group comprising from 1 to 20 carbon atoms.

Embodiment 11: Catalytic system according to embodiment 10 in which $R^1$ and $R^2$ each represent a methyl.

Embodiment 12: Catalytic system according to any one of embodiments 10 to 11, in which Z represents a silicon atom.

Embodiment 13: Catalytic system according to any one of embodiments 1 to 12, in which the metallocene is of formula (III-1), (III-2), (III-3), (III-4) or (III-5):

$$[Me_2Si(Flu)_2Nd(\mu\text{-}BH_4)_2Li(THF)] \quad \text{(III-1)}$$

$$[\{Me_2SiFlu_2Nd(\mu\text{-}BH_4)_2Li(THF)\}_2] \quad \text{(III-2)}$$

$$[Me_2SiFlu_2Nd(\mu\text{-}BH_4)(THF)] \quad \text{(III-3)}$$

$$[\{Me_2SiFlu_2Nd(\mu\text{-}BH_4)(THF)\}_2] \quad \text{(III-4)}$$

$$[Me_2SiFlu_2Nd(\mu\text{-}BH_4)] \quad \text{(III-5)}$$

Flu representing the $C_{13}H_8$ group.

Embodiment 14: Catalytic system according to any one of embodiments 1 to 13, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

Embodiment 15: Catalytic system according to any one of embodiments 1 to 14, in which the carbon atoms of the benzene nucleus of $R^B$ ortho to the magnesium are substituted with a methyl or an ethyl.

Embodiment 16: Catalytic system according to any one of embodiments 1 to 15, in which the carbon atoms of the benzene nucleus of $R^B$ ortho to the magnesium are substituted with a methyl.

Embodiment 17: Catalytic system according to any one of embodiments 1 to 16, in which the organomagnesium reagent is of formula (IV-m)

(IV-m)

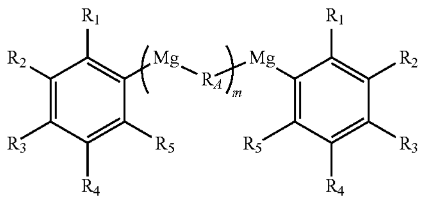

$R_1$ and $R_5$, which are identical or different, represent a methyl or an ethyl, preferably a methyl, $R_2$, $R_3$ and $R_4$, which are identical or different, being a hydrogen atom or an alkyl, $R^A$ being a divalent aliphatic hydrocarbon-based chain, interrupted or not with one or more oxygen or sulfur atoms or with one or more arylene groups, m being a number greater than or equal to 1 and preferably equal to 1.

Embodiment 18: Catalytic system according to any one of embodiments 1 to 17, in which m is equal to 1.

Embodiment 19: Catalytic system according to any one of embodiments 1 to 18, in which $R^A$ is a branched or linear alkanediyl, cycloalkanediyl or xylenediyl radical.

Embodiment 20: Catalytic system according to any one of embodiments 1 to 19, in which $R^A$ contains from 3 to 10 carbon atoms.

Embodiment 21: Catalytic system according to any one of embodiments 1 to 20, in which $R^A$ contains from 3 to 8 carbon atoms.

Embodiment 22: Catalytic system according to any one of embodiments 1 to 21, in which $R^A$ is a linear alkanediyl.

Embodiment 23: Catalytic system according to any one of embodiments 1 to 22, in which the ratio between the number of moles of Mg of the co-catalyst and the number of moles of rare-earth metal of the metallocene ranges from 1 to 200.

Embodiment 24: Catalytic system according to any one of embodiments 1 to 23, in which the ratio between the number of moles of Mg of the co-catalyst and the number of moles of rare-earth metal of the metallocene ranges from 1 to less than 20.

Embodiment 25: Process for preparing a first telechelic polymer, which comprises a step of polymerizing a monomer M in the presence of a catalytic system defined in any one of embodiments 1 to 24, the monomer M being chosen from the group of monomers consisting of 1,3-dienes, ethylene, α-monoolefins and mixtures thereof.

Embodiment 26: Process for preparing a second telechelic polymer, which comprises a step of polymerizing a monomer M in the presence of a catalytic system defined in any one of embodiments 1 to 24, this polymerization step being followed by a step of functionalization with a modifying agent, the monomer M being chosen from the group of monomers consisting of 1,3-dienes, ethylene, α-monoolefins and mixtures thereof.

Embodiment 27: Process for preparing a polymer, which comprises a step of polymerizing a monomer M in the presence of a catalytic system defined in any one of embodiments 1 to 24 and a termination reaction with a protic compound, the monomer M being chosen from the group of monomers consisting of 1,3-dienes, ethylene, α-monoolefins and mixtures thereof.

Embodiment 28: Preparation process according to any one of embodiments 25 to 27, in which the monomer M is ethylene or a mixture of a 1,3-diene and ethylene or a mixture of a 1,3-diene, ethylene and an α-monoolefin.

Embodiment 29: Preparation process according to embodiment 28, in which the 1,3-diene is 1,3-butadiene, isoprene or mixtures thereof.

Embodiment 30: Telechelic polymer of formula (V)

$$R^B\text{—Mg-poly-}R^A\text{-poly-Mg—}R^B \qquad (V)$$

in which $R^B$ is different from $R^A$, $R^A$ is a divalent aliphatic hydrocarbon-based chain, interrupted or not with one or more oxygen or sulfur atoms or with one or more arylene groups, $R^B$ comprising a benzene nucleus substituted with the magnesium atom, one of the carbon atoms of the benzene nucleus ortho to magnesium being substituted with methyl, ethyl, isopropyl or forming a ring with the carbon atom which is its closest neighbour and which is in the meta position relative to magnesium, the other carbon atom of the benzene nucleus ortho to the magnesium being substituted with methyl, ethyl or isopropyl, the term "poly" denotes a polymer chain of a 1,3-diene, ethylene an α-monoolefin or mixtures thereof, preferably a polymer chain of ethylene or a polymer chain of a 1,3-diene and ethylene or a polymer chain of a 1,3-diene, ethylene and an α-monoolefin.

Embodiment 31: Telechelic polymer according to embodiment 30, in which the polymer chain denoted by the name "poly" is a polymer chain of ethylene or a polymer chain of a 1,3-diene and ethylene or a polymer chain of a 1,3-diene, ethylene and an α-monoolefin.

Embodiment 32: Telechelic polymer according to either of embodiments 30 and 31, in which the polymer chain denoted by the name "poly" denotes a polymer chain which contains ethylene units, 1,3-butadiene units and cyclic units, 1,2-cyclohexane units of the following formula.

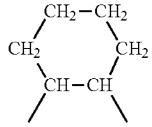

Embodiment 33: Telechelic polymer according to any one of embodiments 30 to 32, in which the polymer chain denoted by the name "poly" denotes a polymer chain containing more than 50 mol % of ethylene units.

Embodiment 34: Telechelic polymer according to any one of embodiments 30 to 33, in which the polymer chain denoted by the name "poly" denotes a statistical polymer chain of a 1,3-diene, ethylene and an α-monoolefin.

Embodiment 35: Telechelic polymer according to any one of embodiments 30 to 34, in which $R^A$ is an alkanediyl, branched or linear, a cycloalkanediyl or a xylenediyl radical.

Embodiment 36: Telechelic polymer according to any one of embodiments 30 to 35, in which $R^A$ contains from 3 to 10 carbon atoms.

Embodiment 37: Telechelic polymer according to any one of embodiments 30 to 36, in which $R^A$ contains from 3 to 8 carbon atoms.

Embodiment 38: Telechelic polymer according to any one of embodiments 30 to 37, in which $R^A$ represents a linear alkanediyl.

Embodiment 39: Telechelic polymer according to any one of embodiments 30 to 38, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

Embodiment 40: Telechelic polymer according to any one of embodiments 30 to 39, in which the carbon atoms of the benzene nucleus of $R^B$ ortho to the magnesium are substituted with a methyl or an ethyl.

Embodiment 41: Telechelic polymer according to any one of embodiments 30 to 40, in which the carbon atoms of the benzene nucleus of $R^B$ ortho to the magnesium are substituted with a methyl.

Embodiment 42: Telechelic polymer according to any one of embodiments 30 to 41, in which $R^B$ has the following formula

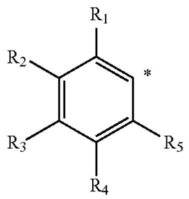

$R_1$ and $R_5$, which are identical or different, represent a methyl or an ethyl, preferably a methyl, $R_2$, $R_3$ and $R_4$, which are identical or different, being a hydrogen atom or an alkyl, the symbol * representing a direct attachment to the magnesium atom.

The abovementioned features of the present invention, and also others, will be understood more clearly on reading the following description of implementation examples of the invention, which are given as non-limiting illustrations.

EXAMPLES

Example 1: Preparation of a Co-Catalyst that is Useful for the Purposes of the Invention, 1,5-di(mesitylmagnesium)pentanediyl (DMMP)

The toluene and 2-methyltetrahydrofuran (MeTHF) used in the syntheses were distilled over sodium/benzophenone. Inertization was performed by three vacuum/argon cycles.

Synthesis of 2-mesitylmagnesium bromide: 4.15 g (170 mmol, 3.4 equivalents) of magnesium are inertized in a 250 mL flask fitted with a magnetized olive and mounted with a 10 mL dropping funnel. A diiodine bead (10 mg) is added to the magnesium. 47.5 mL of MeTHF are placed in the flask with stirring and 2.5 mL are placed in the dropping funnel. 7.65 mL of degassed 2-bromomesitylene (50 mmol, 1 equivalent) dried over activated molecular sieves are placed in the dropping funnel. The flask is heated to 60° C. and the 2-bromomesitylene is added dropwise to the magnesium over 1 hour. Stirring is continued for 3 h at 60° C. and then for 12 h at 20° C.

Aliquot of the concentrated oil in a Young's tube: $^{1}H$ NMR ($C_6D_6$-400 MHz-298 K) δ: ppm=7.01 (s, "a"), 2.74 (s, "b"), 2.36 (s, "c")

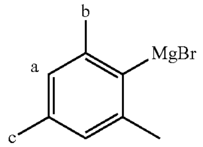

Synthesis of 1,5-di(magnesium bromide)pentanediyl: 6.17 g (250 mmol, 10 equivalents) of magnesium are inertized in a 250 mL flask fitted with a magnetized olive and mounted with a 50 mL dropping funnel. A diiodine bead (10 mg) is added to the magnesium. 10 mL of MeTHF are placed in the flask with stirring and 40 mL are placed in the dropping funnel. 3.41 mL of 1,5-dibromopentane (25 mmol, 1 equivalent) degassed and dried over activated molecular sieves are placed in the dropping funnel. The haloalkane solution is poured dropwise onto the magnesium over 1 h. Stirring is continued for 12 h at 20° C.

Aliquot of the concentrated oil in a Young's tube: $^{1}H$ NMR ($C_6D_6$-400 MHz-298 K) δ: ppm=2.06 (quint, J=7.6 Hz, "b"), 1.80 (quint, J=7.4 Hz, "c"), −0.05 (t, J=7.7 Hz, "a"); quint for quintet.

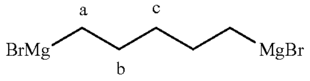

Synthesis of 1,5-di(mesitylmagnesium)pentanediyl: The preceding solution of 2-mesitylmagnesium bromide is cannulated, i.e. transferred via a cannula, into the 1,5-di(magnesium bromide)pentanediyl solution. 20 mL of MeTHF and 10.3 mL 1,4-dioxane (120 mmol, 1.2 equivalents/Mg) are placed in the dropping funnel. This solution is poured into the flask dropwise over 1 h with vigorous stirring. Stirring is continued for 20 h at 20° C. The stirring is stopped and the flask is set aside for 24 h to allow the $MgBr_2$ salts to settle out completely. The supernatant is transferred via the filter cannula into an inertized Schlenk tube, which is fitted with a frit on which 1 cm of calcined celite has been placed, for filtration. Once the salts have been removed, the yellow solution obtained is concentrated under vacuum to give an oil with a mass of 17.88 g (23 mmol as pentanediyl group according to $^{1}H$ NMR estimations). 15.75 mL of toluene are added to 9.1 g (11.7 mmol) of the oil with stirring to give a dilute solution with a concentration of 0.45 mol $L^{-1}$ of pentanediyl group. The density of the concentrated oil was estimated to be 1 g $mL^{-1}$.

Aliquot of the concentrated oil: $^{1}H$ NMR ($C_6D_6$-500 MHz-340 K) δ: ppm=6.90 (s, "d"), 2.54 (s, "e"), 2.29 (s, "f"), 2.20 (quint, J=6.5 Hz, "b"), 1.82 (quint, J=6.0 Hz, "c"), 0.10 (t, J=7.2 Hz, "a")

$^{13}C$ NMR ($C_6D_6$-500 MHz-340 K) δ: ppm=161.00 ("g"), 148.30 ("h"), 135.18 ("i"), 125.74 ("d"), 28.53 ("b"), 28.53 ("c"), 28.11 ("e"), 21.46 ("f"), 10.22 ("a")

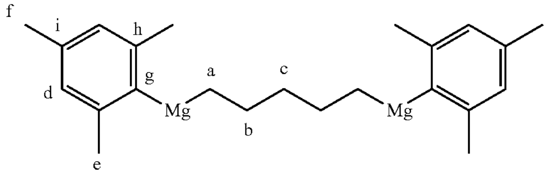

High resolution NMR spectroscopy of organometallic compounds and their precursors was performed on a Bruker 400 Avance III spectrometer operating at 400 MHz equipped with a 5 mm BBFO probe or on a Bruker 500 Avance III spectrometer operating at 500 MHz equipped with a 5 mm BBFO probe. Acquisitions were made at 298 K or 340 K in deuterated benzene ($C_6D_6$). The samples were analysed at a concentration of 5% by mass. The chemical shifts are given in ppm, relative to the $C_6D_5H$ proton signal set at 7.16 ppm and the $C_6D_6$ carbon signal set at 128.06 ppm. The structure of the diorganomagnesium compounds is characterized by 1D $^{1}H$, $^{1}H$-$^{13}C$ HSQC ((Heteronuclear Single Quantum Coherence), $^{1}H$-$^{13}C$ HMBC (Heteronuclear Multiple-Bond Correlation) nuclear magnetic resonance NMR and NOESY. The diorganomagnesium compound is analysed with its synthesis solvent and deuterated benzene ($C_6D_6$) is added to the solution to obtain the NMR "lock".

Example 2: Preparation of a Reference Co-Catalyst, 1,5-Di(Magnesium Bromide)Pentanediyl (DBMP)

9.72 g of magnesium (400 mmol, 10 equivalents), 80 mL of MeTHF (of which 64 mL in the dropping funnel), 60 mg of diiodine (0.23 mmol, 0.006 equivalent) and 5.45 mL of 1,5-dibromopentane (40 mmol, 1 equivalent) were used in the synthesis. The glassware used consisted of a 200 mL flask and a 100 mL dropping funnel. Once the synthesis of the Grignard reagent was complete, the solution is cannulated through the filter cannula into a second inertized 200 mL flask. This solution is concentrated under vacuum and then diluted in 55 mL of toluene. The concentration of pentanediyl group is estimated at 0.43 mol $L^{-1}$. This oil is immiscible in methylcyclohexane.

Aliquot of the concentrated oil: $^{1}H$ NMR (toluene-$D_8$-500 MHz-298 K) δ: ppm=2.21 (quint, J=7.2 Hz, "b"), 1.88 (quint, J=7.0 Hz, "c"), 0.11 (t, J=7.4 Hz, "a")

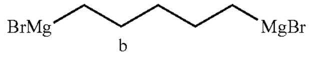

Synthesis of Telechelic and Functional Polymers

Ethylene homopolymers and ethylene-butadiene copolymers were prepared from the complex $\{(Me_2Si(C_{13}H_8)_2)Nd(—BH_4)[(—BH_4)Li(THF)]\}_2$ and the co-catalyst di(mesitylmagnesium)pentanediyl (DMMP) prepared according to the procedure described previously. Polymers were also synthesized using a catalytic system not in accordance with the invention, which comprises as co-catalyst the 1,5-di(magnesium bromide)pentanediyl (DBMP) of Example 2. The polymers were characterized using the methods described hereinbelow.

High temperature size exclusion chromatography (HT-SEC). The high temperature size exclusion chromatography (HT-SEC) analyses were performed with a Viscotek machine (Malvern Instruments) equipped with three columns (PLgel Olexis 300 mm×7 mm I. D. from Agilent Technologies) and three detectors (differential refractometer and viscometer, and light scattering). 200 μL of a solution of the sample at a concentration of 3 mg $mL^{-1}$ were eluted in 1,2,4-trichlorobenzene using a flow rate of 1 mL $min^{-1}$ at 150° C. The mobile phase was stabilized with 2,6-di(tert-butyl)-4-methylphenol (400 mg $L^{-1}$). OmniSEC software was used for data acquisition and analysis. The number-average molar mass (Mn) and mass-average molar mass (Mw) of the synthesized polyethylenes were calculated using a calibration curve obtained from standard polyethylenes ($M_p$: 338, 507, 770, 1890, 17 000, 27 300, 43 400, 53 100, 65 700, 78 400 g·$mol^{-1}$) from Polymer Standard Service (Mainz). The number-average molar mass (Mn) and mass-average molar mass (Mw) of the synthesized ethylene-butadiene copolymers were calculated using a universal calibration curve calibrated from standard polystyrenes (peak molar mass $M_p$: 672 to 12 000 000 g $mol^{-1}$) from Polymer Standard Service (Mainz) using refractometric and viscometric detectors.

THF size exclusion chromatography (THF-SEC). The size exclusion chromatography analyses were performed with a Viscotek machine (Malvern Instruments). This machine is equipped with three columns (SDVB, 5 μm, 300×7.5 mm from Polymer Standard Service), a guard column and three detectors (differential refractometer and viscometer, and light scattering). 3 mL of a solution of the sample with a concentration of 3 mg $mL^{-1}$ in THF were filtered through a 0.45 μm PTFE membrane. 100 μL of this solution were eluted in THF using a flow rate of 1 mL $min^{-1}$ at a temperature of 35° C. OmniSEC software was used for data acquisition and analysis. The molar masses of the synthesized ethylene-butadiene copolymers were calculated using a universal calibration curve obtained from standard polystyrenes ($M_p$: 1306 to 2 520 000 g $mol^{-1}$) from Polymer Standard Service (Mainz).

Nuclear magnetic resonance (NMR). High resolution NMR spectroscopy of the polymers was performed on a Bruker 400 Avance III spectrometer operating at 400 MHz equipped with a 5 mm BBFO probe for the proton and on a Bruker 400 Avance II spectrometer operating at 400 MHz equipped with a 10 mm PSEX $^{13}C$ probe for the carbon. Acquisitions were made at 363 K. A mixture of tetrachloroethylene (TCE) and deuterated benzene ($C_6D_6$) (2/1 v/v) was used as solvent. The samples were analysed at a concentration of 1% by mass for proton and 5% by mass for carbon. The chemical shifts are given in ppm, relative to the deuterated benzene proton signal set at 7.16 ppm and the TCE carbon signal set at 120.65 ppm. The sequence used to acquire a $^{13}C$ spectrum of a polymer is: "Power gate decoupling" (NOE proton-decoupled spectrum) with a pulse angle of 70°, DT=64 K and a delay between pulses of 4.5 s. The number of acquisitions is set at 5120.

Synthesis of Telechelic and Functional Polyethylenes

Example PE1

200 mL of toluene distilled over sodium/benzophenone are placed in an inertized 250 mL flask fitted with a magnetized olive.

2.0 mL (0.90 mmol) of 1,5-di(mesitylmagnesium)pentanediyl prepared according to Example 1 (0.45 mol $L^{-1}$ in toluene) are added to the flask with stirring. 8.0 mg (12.5 μmol as neodymium) of $\{(Me_2Si(C_{13}HS)_2)Nd(—BH_4)[(—BH_4)Li(THF)]\}_2$ are then added to the flask.

The catalytic solution is cannulated into a 250 mL reactor under an inert atmosphere. The argon excess pressure in the reactor is reduced to 0.5 bar and the reactor is then pressurized to 4 bar of ethylene and the temperature is simultaneously brought to 70° C. The pressure is kept constant in the reactor by means of a tank containing ethylene.

When the desired amount of ethylene has been consumed, in this case after 19 min, the reactor is degassed and the temperature is reduced to 20° C. 20% of the polymer solution is cannulated out of the reactor and the polymer contained in this 20% is then precipitated from methanol with stirring. 5.86 g (23 mmol, 16 equivalents/Mg) of diiodine dissolved in 30 mL of toluene are added to the polymer solution remaining in the reactor. After 3 h of stirring, the polymer solution is poured onto methanol with stirring to precipitate the polymer.

The polymer recovered after the reaction with the modifying agent (PE1F) is filtered off, washed with methanol, dried and characterized. It is denoted as PE1F.

The polymer precipitated from methanol prior to the addition of the modifying agent is also recovered by filtration and dried before being characterized as non-functional polymer (PE1NF).

1.13 g of PE1F polymer of formula $I—(CH_2—CH_2)_n—(CH_2)_5—(CH_2—CH_2)_n—I$ and 0.25 g of PE1NF polymer of formula $H—(CH_2—CH_2)_n—(CH_2)_5—(CH_2—CH_2)_n—H$ are recovered.

The proton NMR spectrum of the PE1F polymer (TCE/$C_6D_6$ 2/1 v/v, 400 MHz, 363 K) shows methylene in the α-position of iodine at δ=2.95 ppm (triplet, $(CH_2CH_2)_n—CH_2I$). The degree of functionalization in the PE1F polymer is calculated by determining the content of non-functionalized chains in the polymer. The content of non-functionalized chains in PE1F is determined by normalizing the integrals of the $(CH_2CH_2)_n$ signals of the two $^1H$ NMR spectra to 100 and then dividing the integral of the $CH_3$ signals of the PE1F polymer by that of the $CH_3$ signals of the PE1NF polymer. Thus, in PE1F, 13% of the polymer chain ends are non-functional, and thus 87% of the polymer chain ends have been functionalized with an iodine atom.

Example PE2

The synthesis of the telechelic polymer is similar to that performed in the preceding example PET, except that 4.0 mL (1.80 mmol) of 1,5-di(mesitylmagnesium)pentanediyl prepared according to Example 1 (0.45 mol $L^{-1}$ in toluene) and 10.0 mg (15.6 μmol of neodymium) of $\{(Me_2Si(C_{13}H_8)_2)Nd(—BH_4)[(—BH_4)Li(THF)]\}_2$ are used to prepare the catalytic solution.

When the desired amount of ethylene has been consumed, in this case after 46 min, the reactor is degassed and the temperature is reduced to 20° C. 50% of the polymer solution is cannulated out of the reactor and the polymer (PE2NF) contained in this 50% is then precipitated from methanol with stirring. 2.0 mL (44 mmol, 11 equivalents/Mg) of deuterated methanol diluted in 5 mL of toluene are added to the polymer solution remaining in the reactor. After 1 h of stirring, the polymer solution is poured onto methanol with stirring to precipitate the PE2M polymer.

Each precipitated polymer was filtered off, washed with methanol and then dried. 1.03 g of PE2M polymer:

D-$(CH_2—CH_2)_n$—$(CH_2)_5$—$(CH_2—CH_2)_n$-D and 1.00 g of PE2NF polymer: H—$(CH_2—CH_2)_n$—$(CH_2)_5$—$(CH_2—CH_2)_n$—H are recovered.

The proton NMR spectrum of the PE2M polymer (TCE/$C_6D_6$ 2/1 v/v, 400 MHz, 363 K) allows the observation of methylene in the α-position of deuterium at δ=0.83 (broad, —$CH_2D$)).

The degree of labelling in the PE2M polymer is calculated by determining the content of unlabelled chains in the polymer. The content of unlabelled chains in PE2M is determined by normalizing the integrals of the $(CH_2CH_2)_n$ signals of the two $^{13}C$ NMR spectra to 100 and then dividing the integral of the $CH_3$ signals of the PE2M polymer by that of the $CH_3$ signals of the PE2NF polymer. Thus in PE2M, 9% of the polymer chain ends are unlabelled, and thus 91% of the polymer chain ends have been labelled with a deuterium atom.

Example PE3

The synthesis of the telechelic polymer is similar to that performed in the preceding Example PE2, except that 3.0 mL (1.35 mmol) of 1,5-di(magnesium bromide)pentanediyl prepared according to Example 2 (0.45 mol $L^{-1}$ in toluene) and 10.0 mg (15.6 μmol neodymium) of {$(Me_2Si(C_{13}HS)_2)Nd(—BH_4)[(—BH_4)Li(THF)]$}$_2$ are used to prepare the catalytic solution. The catalytic system is a catalytic system not in accordance with the invention.

When the desired amount of ethylene has been consumed, in this case after 49 min, the reactor is degassed and the temperature is reduced to 20° C. 40% of the polymer solution is cannulated out of the reactor, and the polymer contained in this 40% is then precipitated from methanol with stirring.

2.0 mL (44 mmol, 15 equivalents/Mg) of deuterated methanol diluted in 5 mL of toluene are added to the polymer solution remaining in the reactor. After 1 h of stirring, the polymer solution is poured onto methanol with stirring to precipitate the polymer.

Each polymer is filtered off, washed with methanol and then dried. 1.14 g of PE3M polymer: D-$(CH_2—CH_2)_n$—$(CH_2)_5$—$(CH_2—CH_2)_n$-D and 0.70 g of PE3NF polymer: H—$(CH_2—CH_2)_n$—$(CH_2)_5$—$(CH_2—CH_2)_n$—H are recovered.

The proton NMR spectrum of the PE3M polymer (TCE/$C_6D_6$ 2/1 v/v, 400 MHz, 363 K) allows the observation of methylene in the α-position of deuterium at δ=0.83 (broad, —$CH_2D$)).

The degree of labelling in the PE3M polymer is calculated by determining the content of unlabelled chains in the polymer. The content of unlabelled chains in PE3M is determined by normalizing the integrals of the $(CH_2CH_2)_n$ signals of the two $^{13}C$ NMR spectra to 100 and then dividing the integral of the $CH_3$ signals of the PE3M polymer by that of the $CH_3$ signals of the PE3NF polymer. Thus in PE3M, 11% of the polymer chain ends are unlabelled, and thus 89% of the polymer chain ends have been labelled with a deuterium atom.

The conditions for the polymerization of ethylene are given in Table 1. Table 1 also shows for each example the catalytic activity calculated over the entire polymerization time and expressed in $Kg \cdot mol^{-1} \cdot h^{-1}$. The characteristics of the synthesized polyethylene polymers are shown in Table 2. The HT-SEC method was used.

Synthesis of Telechelic and Functional Copolymers of Ethylene and 1,3-butadiene

Example EBR1

200 mL of toluene purified on an activated alumina column (also known as a solvent fountain) are placed in an inertized 250 mL flask equipped with a magnetized olive. 2.2 mL (1.0 mmol) of 1,5-di(mesitylmagnesium)pentanediyl prepared according to Example 1 (0.45 mol $L^{-1}$ in toluene) are added to the flask with stirring. 32.0 mg (50 μmol as neodymium) of {$(Me_2Si(C_{13}Hs)_2)Nd(—BH_4)[(—BH_4)Li(THF)]$}$_2$ are then added to the flask.

The catalytic solution is cannulated into a 250 mL reactor under an inert atmosphere. The argon excess pressure in the reactor is reduced to 0.5 bar, and the reactor is then pressurized to 4 bar with an 80/20 molar ethylene/butadiene mixture and the temperature is simultaneously brought to 70° C. The pressure is kept constant in the reactor by means of a tank containing an 80/20 molar ethylene/butadiene gas mixture.

The reactor is degassed when 10 g of the target monomers are consumed, in this case after 145 min, and the temperature is reduced to 20° C.

To determine the microstructure and macrostructure of the telechelic polymer, the polymer solution is poured onto methanol with stirring to precipitate the polymer. The polymer is washed with methanol and then dried. 10.50 g of polymer are recovered.

Example EBR2

The synthesis of the telechelic polymer is similar to that performed in the preceding example EBR1, except that 1.1 mL (0.5 mmol) of 1,5-di(mesitylmagnesium)pentanediyl prepared according to Example 1 (0.45 mol $L^{-1}$ in toluene) are used to prepare the catalytic solution.

10 g of the target monomers are consumed after 112 min of polymerization. 10.33 g of polymer are actually recovered.

Example EBR3

The synthesis of the telechelic polymer is similar to that performed in the preceding example EBR1, except that 0.55 mL (0.25 mmol) of 1,5-di(mesitylmagnesium)pentanediyl prepared according to Example 1 (0.45 mol $L^{-1}$ in toluene) are used to prepare the catalytic solution.

10 g of the target monomers are consumed after 86 min of polymerization. 10.66 g of polymer are actually recovered.

Example EBR4

The synthesis of the telechelic polymer is similar to that performed in the preceding Example EBR1, except that 2.3 mL (1.0 mmol) of 1,5-di(magnesium bromide)pentanediyl prepared according to Example 2 (0.43 mol $L^{-1}$ in toluene) are used as co-catalyst to prepare the catalytic solution. The catalytic system is a catalytic system not in accordance with the invention.

10 g of the target monomers are consumed after 175 min of polymerization. 10.57 g of polymer are recovered.

Example EBR5

The synthesis of the telechelic polymer is similar to that performed in the preceding example EBR4, except that 1.15 mL (0.5 mmol) of 1,5-di(magnesium bromide)pentanediyl prepared according to Example 2 (0.43 mol $L^{-1}$ in toluene) are used as co-catalyst to prepare the catalytic solution. The catalytic system is a catalytic system not in accordance with the invention.

10 g of the target monomers are consumed after 129 min of polymerization. 9.50 g of polymer are actually recovered.

Example EBR6

The synthesis of the telechelic polymer is similar to that performed in the preceding example EBR4, except that 0.58 mL (0.25 mmol) of 1,5-di(magnesium bromide)pentanediyl prepared according to Example 2 (0.43 mol $L^{-1}$ in toluene) are used as co-catalyst to prepare the catalytic solution. The catalytic system is a catalytic system not in accordance with the invention.

10 g of the target monomers are consumed after 105 min of polymerization. 10.06 g of polymer are actually recovered.

The conditions for the copolymerization of ethylene and 1,3-butadiene are given in Table 3. The catalytic activity expressed in Kg·$mol^{-1}$·$h^{-1}$ is measured for each example at 80 minutes of polymerization and is shown in Table 3. The characteristics of the synthesized copolymers are shown in Table 4 and Table 5. The THF-SEC method was used for polymers EBR1 to EBR3; the HT-SEC method was used for polymers EBR4 to EBR6. The microstructure of the polymers was determined by NMR. The ethylene unit content, the 1,3-butadiene unit content in the 1,2-configuration (1,2-unit), in the 1,4-configuration (1,4-unit) and the 1,2-cyclohexane unit content (ring unit) are expressed as molar percentages relative to the total monomer units of the polymer.

RESULTS

The polymers of Examples PE1, PE2, EBR1 and EBR2 are synthesized in accordance with a process in accordance with the invention, the catalytic system being in accordance with the invention. The polymers of Examples PE3, EBR3, EBR4 and EBR5 are synthesized according to a process not in accordance with the invention, the catalytic system not being in accordance with the invention.

The results show that the use of a catalytic system in accordance with the invention allows the synthesis of telechelic polymers by polymerization of an olefin such as ethylene or a 1,3-diene such as 1,3-butadiene, and also by their copolymerization. The telechelic nature is shown in particular on the one hand by marking the polymer ends by reaction with deuterated methanol (PE2M), and on the other hand by functionalizing them with iodine (PE1F). The telechelic nature is high, taking into consideration the degrees of functionalization after reaction with diiodine (87%) and considering the content of labelled polymer (Table 2, degree of labelling: 91%) and the average number of deuterated ends per polymer chain (Table 2, labelled end per chain: 1.8 for a theoretical value of 2).

Moreover, both for the synthesis of homopolymers and for the synthesis of copolymers, it is noted that the catalytic activity of the catalytic system is much higher with the use of a catalytic system in accordance with the invention than with the use of a non-compliant catalytic system.

TABLE 1

| Polymer | Co-catalyst | Mg/Nd mole ratio | Modifying agent or protic compound | Time (min) | Activity (kg $mol^{-1}h^{-1}$) |
|---|---|---|---|---|---|
| PE1F | DMMP | 144 | diiodine | 19 | 315 |
| PE1NF | DMMP | 144 | MeOH | 19 | 315 |
| PE2M | DMMP | 231 | MeOD | 46 | 172 |
| PE2NF | DMMP | 231 | MeOH | 36 | 172 |
| PE3M | DBMP | 173 | MeOD | 49 | 118 |
| PE3NF | DBMP | 173 | MeOH | 49 | 118 |

TABLE 2

| Polymer | $M_n$NMR (g $mol^{-1}$) | $M_n$ SEC (g $mol^{-1}$) | D (Mw/Mn) | Chain end | Degree of functionality or labelling (%) | Labelled end per chain |
|---|---|---|---|---|---|---|
| PE1F | 1740 | 1640 | 1.48 | I | 87 | |
| PE1NF | 1400 | 1440 | 1.62 | H | — | |
| PE2M | 1250 | 940 | 1.45 | D | 91 | 1.82 |
| PE2NF | 1250 | 940 | 1.44 | H | — | |
| PE3M | 1630 | 1480 | 1.14 | D | 89 | 1.78 |
| PE3NF | 1630 | 1530 | 1.14 | H | — | |

TABLE 3

| Polymer | Co-catalyst | Mg/Nd mole ratio | Modifying agent or protic compound | Time (min) | Activity (kg $mol^{-1}h^{-1}$) |
|---|---|---|---|---|---|
| EBR1 | DMMP | 40 | MeOH | 145 | 94 |
| EBR2 | DMMP | 20 | MeOH | 112 | 134 |
| EBR3 | DMMP | 10 | MeOH | 86 | 193 |
| EBR4 | DBMP | 40 | MeOH | 175 | 64 |
| EBR5 | DBMP | 20 | MeOH | 129 | 101 |
| EBR6 | DBMP | 10 | MeOH | 105 | 153 |

TABLE 4

| Polymer | $M_n$SEC (g $mol^{-1}$) | D | Chain end |
|---|---|---|---|
| EBR1 | 9800 | 1.29 | H |
| EBR2 | 18000 | 1.23 | H |
| EBR3 | 33100 | 1.29 | H |
| EBR4 | 13600 | 1.37 | H |
| EBR5 | 20000 | 1.44 | H |
| EBR6 | 35620 | 1.65 | H |

TABLE 5

| Polymer | Ethylene unit | 1,2 unit | 1,4 unit | Ring unit |
|---|---|---|---|---|
| EBR1 | 75.3 | 9.4 | 5.6 | 9.7 |
| EBR2 | 73.8 | 10.8 | 6.1 | 9.3 |
| EBR3 | 73.4 | 11.0 | 6.3 | 9.3 |
| EBR4 | 75.9 | 8.5 | 5.0 | 10.6 |
| EBR5 | 75.9 | 8.8 | 5.2 | 10.1 |
| EBR6 | 76.0 | 8.9 | 5.3 | 9.8 |

The invention claimed is:

1. A catalytic system based at least:

on a metallocene of formula (Ia) or (Ib), on an organomagnesium reagent as co-catalyst, $\{P(Cp^1)(Cp^2)Y\}$ (Ia)

$Cp^3Cp^4Y$ (Ib)

Y denoting a group including a rare-earth metal atom, $Cp^1$, $Cp^2$, $Cp^3$ and $Cp^4$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the organomagnesium reagent being a compound of formula (II)

$R^B—(Mg—R^A)_m—Mg—R^B$ (II)

$R^B$ being different from $R^A$, $R^B$ comprising a benzene nucleus substituted with the magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being a divalent aliphatic hydrocarbon-based chain, interrupted or not with one or more oxygen or sulfur atoms or with one or more arylene groups, m being a number greater than or equal to 1.

2. The catalytic system according to claim 1, in which $Cp^1$ and $Cp^2$ are identical and are chosen from the group consisting of substituted fluorenyl groups and the unsubstituted fluorenyl group of formula $C_{13}H_8$.

3. The catalytic system according to claim 1, in which the symbol Y represents the group Met-G, with Met denoting the rare-earth metal atom and G denoting a group comprising the borohydride $BH_4$ unit or denoting a halogen atom chosen from the group consisting of chlorine, fluorine, bromine and iodine.

4. The catalytic system according to claim 3, in which G denotes a chlorine atom or the group of formula (III)

$(BH_4)_{(1+y)}\text{-}L_y\text{-}N_x$ (III)

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

5. The catalytic system according to claim 1, in which the rare-earth metal is a lanthanide, the atomic number of which ranges from 57 to 71.

6. The catalytic system according to claim 1, in which the bridge P corresponds to the formula $ZR^1R^2$, Z representing a silicon or carbon atom and $R^1$ and $R^2$, which are identical or different, each representing an alkyl group comprising from 1 to 20 carbon atoms.

7. The catalytic system according to claim 1, in which the metallocene is of formula (III-1), (III-2), (III-3), (III-4) or (III-5):

$[Me_2Si(Flu)_2Nd(\mu\text{-}BH_4)_2Li(THF)]$ (III-1)

$[\{Me_2SiFlu_2Nd(\mu\text{-}BH_4)_2Li(THF)\}_2]$ (III-2)

$[Me_2SiFlu_2Nd(\mu\text{-}BH_4)(THF)]$ (III-3)

$[\{Me_2SiFlu_2Nd(\mu\text{-}BH_4)(THF)\}_2]$ (III-4)

$[Me_2SiFlu_2Nd(\mu\text{-}BH_4)]$ (III-5)

Flu representing the $C_{13}H_8$ group.

8. The catalytic system according to claim 1, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

9. The catalytic system according to claim 1, in which the carbon atoms of the benzene nucleus of $R^B$ ortho to the magnesium are substituted with a methyl or an ethyl.

10. The catalytic system according to claim 1, in which the organomagnesium reagent is of formula (IV-m)

(IV-m)

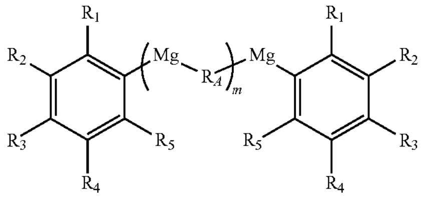

$R_1$ and $R_5$, which are identical or different, represent a methyl or an ethyl, $R_2$, $R_3$ and $R_4$, which are identical or different, being a hydrogen atom or an alkyl, $R^A$ being a divalent aliphatic hydrocarbon-based chain, interrupted or not with one or more oxygen or sulfur atoms or with one or more arylene groups, m being a number greater than or equal to 1.

11. The catalytic system according to claim 1, in which $R^A$ is a branched or linear alkanediyl, cycloalkanediyl or xylenediyl radical.

12. A process for preparing a first telechelic polymer, which comprises a step of polymerizing a monomer M in the presence of a catalytic system defined in claim 1, the monomer M being chosen from the group of monomers consisting of 1,3-dienes, ethylene, α-monoolefins and mixtures thereof.

13. A process for preparing a second telechelic polymer, which comprises a step of polymerizing a monomer M in the presence of a catalytic system defined in claim 1, this polymerization step being followed by a step of functionalization with a modifying agent, the monomer M being chosen from the group of monomers consisting of 1,3-dienes, ethylene, α-monoolefins and mixtures thereof.

14. A process for preparing a polymer, which comprises a step of polymerizing a monomer M in the presence of a catalytic system defined in claim 1 and a termination reaction with a protic compound, the monomer M being chosen from the group of monomers consisting of 1,3-dienes, ethylene, α-monoolefins and mixtures thereof.

15. A telechelic polymer of formula (V)

$R^B—Mg\text{-}poly\text{-}R^A\text{-}poly\text{-}Mg—R^B$ (V)

$R^A$ and $R^B$ being defined according to claim 1, the name "poly" denoting a polymer chain of a 1,3-diene, of ethylene or of an α-monoolefin, or mixtures thereof.

16. The catalytic system according to claim 1, in which m is equal to 1.

17. The catalytic system according to claim 2, in which $Cp^1$ and $Cp^2$ each represent an unsubstituted fluorenyl group of formula $C_{13}H_8$.

18. The catalytic system according to claim 4, in which N represents a molecule of diethyl ether or tetrahydrofuran.

19. The catalytic system according to claim 5, in which the rare-earth metal is neodymium.

20. The catalytic system according to claim 6, in which $R^1$ and $R^2$ each represent a methyl.

* * * * *